US006924321B2

United States Patent
Casati et al.

(10) Patent No.: US 6,924,321 B2
(45) Date of Patent: Aug. 2, 2005

(54) POLYOLS WITH AUTOCATALYTIC CHARACTERISTICS AND POLYURETHANE PRODUCTS MADE THEREFROM

(75) Inventors: Francois Casati, Rousseau (FR); Jean-Marie Louis Sonney, Mont d'Eaux (CH)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/380,299

(22) PCT Filed: Aug. 16, 2001

(86) PCT No.: PCT/US01/25633

§ 371 (c)(1),
(2), (4) Date: Mar. 13, 2003

(87) PCT Pub. No.: WO02/22702

PCT Pub. Date: Mar. 21, 2002

(65) Prior Publication Data

US 2004/0102535 A1 May 27, 2004

(51) Int. Cl.⁷ .............................................. C08G 18/00
(52) U.S. Cl. ......................... 521/167; 528/60; 528/65; 528/68; 528/76; 528/77
(58) Field of Search .......................... 521/167; 528/76, 528/77, 68, 60, 65

(56) References Cited

U.S. PATENT DOCUMENTS

| | | | |
|---|---|---|---|
| 3,248,424 A | * | 4/1966 | Muller et al. ................. 564/48 |
| 3,661,860 A | * | 5/1972 | Schwarz ....................... 528/78 |
| 3,821,130 A | * | 6/1974 | Barron et al. ................ 521/133 |
| 3,838,076 A | | 9/1974 | Moss et al. |
| 4,122,038 A | | 10/1978 | Sandner et al. |
| 4,517,313 A | | 5/1985 | Nakatani |
| 4,963,399 A | | 10/1990 | Gill |
| 5,308,882 A | | 5/1994 | Washington |
| 5,672,636 A | | 9/1997 | Horn et al. |

FOREIGN PATENT DOCUMENTS

| | | | |
|---|---|---|---|
| DE | 235878 | * | 4/1985 |
| EP | 0 227 140 | | 1/1987 |
| EP | 0 376 602 A2 | | 4/1990 |
| EP | 0 176 013 B1 | | 11/1990 |
| EP | 708126 | * | 3/1996 |
| EP | 718276 | * | 6/1996 |
| EP | 0 488 219 B1 | | 3/1997 |
| EP | 0 539 819 B1 | | 6/1998 |
| EP | 0 747 407 B1 | | 1/1999 |
| JP | 00270718 | * | 3/1990 |
| WO | 94/02525 | | 2/1994 |

OTHER PUBLICATIONS

Oertel; Handbook of Polyurethanes; 1985; p. 50.*
"Manufacture of polyurethanes for semi–rigid foams and polyol compositions.", Chemical Abstracts, vol. 113, No. 6, p. 70, Aug. 6, 1990, Columbus, Ohio.
"Autocatalytic polyether polyol", Chemical Abstracts, vol. 106, No. 8, Feb. 23, 1987, Columbus, Ohio.

* cited by examiner

*Primary Examiner*—Rachel Gorr

(57) ABSTRACT

The present invention discloses a process for producing a polyurethane product with autocatalytic polyols. These autocatalytic polyols are based on an initiator that contains a tertiary amine. These autocatalytic polyols are reacted with a polyisocyanate in the presence of other additives and/or auxiliary agents known per se to produce polyurethane products.

20 Claims, No Drawings

POLYOLS WITH AUTOCATALYTIC CHARACTERISTICS AND POLYURETHANE PRODUCTS MADE THEREFROM

The present invention pertains to low emission polyurethane polymer products based on autocatalytic polyols and to the process for their manufacture.

Polyether polyols based on the polymerization of alkylene oxides, and/or polyester polyols, are the major components of a polyurethane system together with isocyanates. These systems generally contain additional components such as cross-linkers, chain extenders, surfactants, cell regulators, stabilizers, antioxidants, flame retardant additives, eventually fillers, and typically catalysts such as tertiary amines and/or organometallic salts.

Organometallic catalysts, such as lead or mercury salts, can raise environmental issues due to leaching upon aging of the polyurethane products. Others, such as tin salts, are often detrimental to polyurethane aging.

The commonly used tertiary amine catalysts give rise to several problems, particularly in flexible, semi-rigid and rigid foam applications. Freshly prepared foams using these catalysts often exhibit the typical odor of the amines and give rise to increased fogging (emission of volatile products).

The presence, or formation, of even traces of tertiary amine catalyst vapors in polyurethane products having vinyl films or polycarbonate sheets exposed thereto can be disadvantageous. Such products commonly appear in automotive interiors as seats, armrests, dashboards or instrument panels, sun visors, door linings, noise insulation parts either under the carpet or in other parts of the car interior or in the engine compartment, as well as in many domestic applications such as shoe soles, cloth interliners, appliance, furniture and bedding. While these materials perform excellently in these applications, they possess a deficiency that has been widely recognized. Specifically, the tertiary amine catalysts present in polyurethane foams have been linked to the staining of the vinyl film and degradation of polycarbonate sheets. This PVC staining and polycarbonate decomposition problems are especially prevalent in environments wherein elevated temperatures exist for long periods of time, such as in automobile interiors, which favor emission of amine vapors.

Various solutions to this problem have been proposed. For instance, U.S. Pat. No. 4,517,313 discloses the use of the reaction product of dimethylaminopropylamine and carbonic acid as a catalyst for use in the manufacture of polyurethane. The use of this catalyst is stated to reduce odor and vinyl staining relative to the use of standard triethylenediamine catalysts. However this amine catalyst cannot match the performance of a standard catalyst such as triethylenediamine in polyurethane curing since it is a much weaker catalyst. EP 176,013 discloses the use of specific aminoalkylurea catalysts in the manufacture of polyurethanes. Use of these catalysts is also said to reduce odor and vinyl staining through the use of relatively high molecular weight amine catalysts. Due to their high molecular weight, these amine catalysts are unable to readily migrate through a polyurethane foam and thus their propensity to produce odors and stain vinyl films is reduced. However, when subjected to elevated temperatures as are commonly encountered in automobile interiors, these compounds migrate within a foam to some degree.

Use of amine catalysts which contain a hydrogen isocyanate reactive group such as a hydroxyl or a primary and/or a secondary amine are proposed by catalyst suppliers. One such compound is disclosed in EP 747,407. Another type of reactive monol catalyst is described in U.S. Pat. No. 4,122, 038. A reported advantage of the catalyst composition is they are incorporated into the polyurethane product. However those catalysts usually have to be used at high levels in the polyurethane formulation to compensate for their lack of mobility during the reactions to get normal processing conditions. As a result generally not all of these molecules have time to react with isocyanates and some traces of free amine are typically present in the final product, especially in the case of fast gelling and fast curing system.

Pre-polymerization of reactive amine catalysts with a polyisocyanate and a polyol is reported in PCT WO 94/02525. These isocyanate-modified amines show comparable or enhanced catalytic activity compared with the corresponding non-modified amine catalysts. However, this process gives handling difficulties such as gel formation and poor storage stability.

Specific crosslinkers are proposed in U.S. Pat. No. 4,963, 399 to produce polyurethane foams that exhibit a reduced tendency to stain vinyl films. These crosslinkers cannot be used at levels sufficient to get the desired catalytic activity, since they negatively affect foam processing, due to too fast gelling, and foam properties such as tear strength and elongation at break are detrimentally affected due to a level of crosslinking density which is too high. Such disadvantages would also be present for long chain tertiary aminoalcohol crosslinkers as disclosed in EP 488,219.

Modification of polyols by partial amination has been disclosed in U.S. Pat. No. 3,838,076. While this gives additional reactivity to the polyol, this does not allow adjustment of processing conditions since these aminated functions are rapidly tied in the polymer by reacting with the isocyanate. Hence they give fast initiation of the reactions but subsequently loose most of their catalytic activity and do not provide proper final curing.

Use of specific amine-initiated polyols is proposed in EP 539,819 and in U.S. Pat. No. 5,672,636 as applied in semi-rigid and rigid polyurethane foam applications.

Acid modified polyoxypropyleneamine are used as catalysts in U.S. Pat. No. 5,308,882 but still require the use of an organometallic co-catalyst.

Therefore, there continues to be a need for alternative means to control vinyl staining and polycarbonate decomposition by polyurethane compositions.

There also remains a need to eliminate or reduce the amount of amine catalysts and/or organometallic salts in producing polyurethane products.

It is an object of the present invention to produce polyurethane products containing a reduced level of conventional tertiary amine catalysts, a reduced level of reactive amine catalysts or polyurethane products produced in the absence of such amine catalyst. It an another objective of the present invention to produce polyurethane products containing a reduced level of organometallic catalyst or to produce such products in the absence of organometallic catalysts. With the reduction of the amount of amine and/or organometallic catalysts needed or elimination of such catalysts, the disadvantages associated with such catalysts as given above can be minimized or avoided.

It is a further object of the present invention to provide polyols containing autocatalytic activity so that the industrial manufacturing process of the polyurethane product is not adversely affected and may even be improved by the reduction in the amount of conventional or reactive amine catalysts or in elimination of the amine catalyst, and/or by reduction or elimination of organometallic catalysts.

In another aspect, the use of the autocatalytic polyols of the present invention could reduce the level of amine catalysts to which workers would be exposed in the atmosphere in a manufacturing plant.

The present invention is a process for the production of a polyurethane product by reaction of a mixture of (a) at least one organic polyisocyanate with
(b) a polyol composition comprising (b1) from 0 to 95 percent by weight of a polyol compound having a functionality of 2 to 8 and a hydroxyl number of from 20 to 800 and (b2) from 5 to 100 percent by weight of at least one polyol compound having a functionality of 1 to 8 and a hydroxyl number of from 20 to 200, wherein the weight percent is based on the total amount of polyol component (b), and (b2) is obtained by alkoxylation of at least one initiator molecule of (b2a), (b2b), (b2c), (b2d) or (b2e) wherein (b2a) is

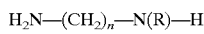  Formula (I)

where n, is an integer from, 2 to 12, and

R is a $C_1$ to $C_3$ alkyl group;

(b2b) is a compound which contains a dialkylylamino group pendant to a polyhydroxy or polyamino molecule of Formula II

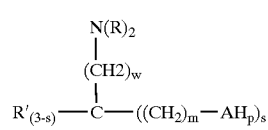 (Formula II)

where R' at each occurrence is independently a $C_1$ to $C_3$ alkyl group and R is as previously defined;

s is an integer from 1 to 3;

m is an integer from 1 to 12;

A is nitrogen or oxygen; and p is 2 when A is nitrogen and is 1 when A is oxygen;

w is 0, 1 or 2;

(b2c) is a dimethylamino group pendant to a monohydroxy or monamino structure of Formula III

 (Formula III)

where $R^2$ is $NR'_2$ or a 5 substituted, 1-aza-3,7-dioxabicyclo [3.3.0] octane;

R, R', A, and p, are as previously defined;

y is 0 or 1; and x is 0, 1 or 2;

(b2d) is a bis-N-substituted piperazine wherein the substitution is an amino or hydroxy substituted C1 to C6 linear or branched alkyl;

(b2e) is a compound of Formula IV

 (Formula IV)

with $R^3$ a C5 to C6 cycloalkyl group and R is as previously defined (b2f) is a compound of Formula V

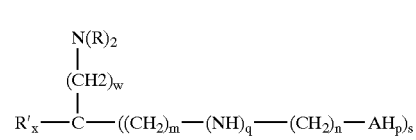 (Formula V)

where R, R', m, n, A, p and w are as previously defined;

x is 0, 1 or 2;

s is and integer from 1 to 3;

and q is an integer from 0 to 12;

or (b2) is a hydroxyl-tipped prepolymer obtained from the reaction of an excess of (b2a), (b2b), (b2c), (b2d), (b2e) or (b2f) with a polyisocyanate;

or (b2) is (b2g) a blend selected from (b2a), (b2b) (b2c), (b2d), (b2e) (b2f) or hydroxyl-terminated prepolymers obtained from polyols based on initiators (b2a)-(b2f);

(c) optionally in the presence of a blowing agent; and (d) optionally additives or auxiliary agents known per se for the production of polyurethane foams, elastomers and/or coatings.

In another embodiment, the present invention is a process as disclosed above wherein the polyisocyanate (a) contains at least one polyisocyanate that is a reaction product of a excess of polyisocyanate with a polyol as defined by (b2a), (b2b), (b2c), (b2d), (b2e), (b2f) above, or a mixture thereof.

In a further embodiment, the present invention is a process as disclosed above where the polyisocyanate contains a polyol-terminated prepolymer obtained by the reaction of an excess of polyol with a polyisocyanate wherein the polyol is a polyol as defined by (b2a), (b2b), (b2c), (b2d), (b2e), (b2f) above, or a mixture thereof.

The invention further provides for polyurethane products produced by any of the above processes.

In still another embodiment, the present invention is an isocyanate-terminated prepolymer based on the reaction of a polyol as defined by (b2a,) (b2b), (b2c), (b2d), (b2e), (b2f) or a mixture thereof with an excess of a polyisocyanate.

In yet another embodiment, the present invention is a polyol-terminated prepolymer based on the reaction of a polyisocyanate with an excess of polyol as defined by (b2a), (b2b), (b2c), (b2d), (b2e), (b2f) or a mixture thereof.

The polyols containing bonded alkyl amine groups as disclosed in the present invention are catalytically active and accelerate the addition reaction of organic polyisocyanates with polyhydroxyl or polyamino compounds and the reaction between the isocyanate and the blowing agent such as water or a carboxylic acid or its salts. The addition of these polyols to a polyurethane reaction mixture reduces or eliminates the need to include a conventional tertiary amine catalyst within the mixture or an organometallic catalyst. Their addition to polyurethane reaction mixtures can also reduce the mold dwell time in the production of molded foams or improve some polyurethane product properties.

As the disclosed polyols have an autocatalytic activity, these polyols require less capping with primary hydroxyls, that is, less ethylene oxide capping to obtain the same performance in flexible molded foam (curing time) than conventional polyols when used under the same conditions. These polyols also have the tendency to reduce the burning rate of foams made therefrom when tested according to MVSS 302 test.

In accordance with the present invention, a process for the production of polyurethane products is provided, whereby polyurethane products of relatively low odor and low emission of amine catalyst are produced. Furthermore, the polyurethane products produced in accordance with the invention exhibit a reduced tendency to stain vinyl films or to degrade polycarbonate sheets with which they are exposed, display excellent adhesion properties (in appropriate formulations), have a reduced tendency to produce 'blue haze' which is associated with the use of certain tertiary amine catalysts, are more environmental friendly through the reduction/elimination of organometallic catalysts and these new polyurethane products should be easier to recycle by chemolysis since they possess an inherent basicity. These advantages are achieved by including in the reaction mixture either a polyol containing a tertiary alkyl amine of (b2) as an initiator, or by including such polyols as feedstock in the preparation of a SAN, PIPA or PHD copolymer polyol and adding them to the reaction mixture or by using such polyols in a prepolymer with a polyisocyanate alone or with an isocyanate and a second polyol.

The combination of polyols used in the present invention will be a combination of (b1) and (b2) as described above. As used herein the term polyols are those materials having at least one group containing an active hydrogen atom capable of undergoing reaction with an isocyanate. Preferred among such compounds are materials having at least two hydroxyls, primary or secondary, or at least two amines, primary or secondary carboxylic acid, or thiol groups per molecule. Compounds having at least two hydroxyl groups per molecule are especially preferred due to their desirable reactivity with polyisocyanates.

Suitable polyols (b1) that can be used to produce polyurethane materials with the autocatalytic polyols (b2) of the present invention are well known in the art and include those described herein and any other commercially available polyol and/or SAN, PIPA or PHD copolymer polyols. Such polyols are described in Polyurethane handbook, by G. Oertel, Hanser publishers. Mixtures of one or more polyols and/or one or more copolymer polyols may also be used to produce polyurethane foams according to the present invention.

Representative polyols include polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491. Alternative polyols that may be used include polyalkylene carbonate-based polyols and polyphosphate-based polyols. Preferred are polyols prepared by adding ar alkylene oxide, such as ethylene oxide, propylene oxide, butylene oxide or a combination thereof, to an initiator having from 2 to 8, preferably 2 to 6 active hydrogen atoms. Catalysis for this polymerization can be either anionic or cationic with catalysts such as KOH, CsOH, boron trifluoride, or a double cyanide complex (DMC) catalyst such as zinc hexacyanocobaltate.

The polyol or blends thereof employed depends upon the end use of the polyurethane product to be produced. The molecular weight or hydroxyl number of the base polyol may thus be selected so as to result in flexible, semi-flexible, integral-skin or rigid foams, elastomers or coatings, or adhesives when the polymer/polyol produced from the base polyol is converted to a polyurethane product by reaction with an isocyanate, and depending on the end product in the presence of a blowing agent. The hydroxyl number and molecular weight of the polyol or polyols employed can vary accordingly over a wide range. In general, the hydroxyl number of the polyols employed may range from 20 to 800.

In the production of a flexible polyurethane foam, the polyol is preferably a polyether polyol and/or a polyester polyol. The polyol generally has an average functionality ranging from 2 to 5, preferably 2 to 4, and an average hydroxyl number ranging from 20 to 100 mg KOH/g, preferably from 20 to 70 mgKOH/g. As a further refinement, the specific foam application will likewise influence the choice of base polyol. As an example, for molded foam, the hydroxyl number of the base polyol may be on the order of 20 to 60 with ethylene oxide (EO) capping, and for slabstock foams the hydroxyl number may be on the order of 25 to 75 and is either mixed feed EO/PO (propylene oxide) or is only slightly capped with EO or is 100 percent PO based. For elastomer applications, it will generally be desirable to utilize relatively high molecular weight base polyols, from 2,000 to 8,000, having relatively low hydroxyl numbers, for example, 20 to 50.

Typically polyols suitable for preparing rigid polyurethanes include those having an average molecular weight of 100 to 10,000 and preferably 200 to 7,000. Such polyols also advantageously have a functionality of at least 2, preferably 3, and up to 8, preferably up to 6, active hydrogen atoms per molecule. The polyols used for rigid foams generally have a hydroxyl number of 200 to 1200 and more preferably, from 300 to 800.

For the production of semi-rigid foams, it is preferred to use a trifunctional polyol with a hydroxyl number of 30 to 80.

The initiators for the production of polyols (b1) generally have 2 to 8 functional groups that will react with the polyol. Examples of suitable initiator molecules are water, organic dicarboxylic acids, such as succinic acid, adipic acid, phthalic acid and terephthalic acid and polyhydric, in particular dihydric to octahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof. Other initiators include compounds linear and cyclic compounds containing a tertiary amine such as ethanoldiamine, triethanoldiamine, and various isomers of toluene diamine.

The autocatalytic polyols (b2) are those initiated with an amine as described by (b2a), (b2b), (b2c), (b2d), or (b2e).

The properties of the autocatalytic polyols can vary widely as described above for polyol (b1) and such parameters as average molecular weight, hydroxyl number, functionality, etc. will generally be selected based on the end use application of the formulation, that is, what type of polyurethane product. Selection of a polyol with the appropriate hydroxyl number, level of ethylene oxide, propylene oxide and butylene oxide, functionality and equivalent weight are standard procedures known to those skilled in the art. For example, polyols with a high level of ethylene oxide will be hydrophilic and may be more prone to catalyze the water-isocyanate or urea reaction, while polyols with a high amount of propylene oxide or butylene oxide will be more hydrophobic and will favor the urethane reaction.

The production of polyols containing the compounds (b2a), (b2b), (b2c,) (b2d) or (b2e) as an initiator can be done by procedures well known in the art as disclosed for (b1). The addition of the first alkylene oxide moles onto the products of formula (b2a), (b2b), (b2c), (b2d) or (b2e) can be done auto-catalytically, that is, without addition of catalyst. In general, a polyol (b2) is made by the addition of an alkylene oxide (EO, PO, or BO), or a combination of alkylene oxides to the initiator by anionic or cationic reaction or use of DMC catalyst. For some applications only one alkylene oxide monomer is used, for other applications a blend of monomers is used and in some cases a sequential addition of monomers is preferred, such as PC followed by an EO feed, EO followed by PO, etc. Processing conditions such as reactor temperature and pressure, feeding rates and catalyst level are adjusted to optimize production yield. Of particular importance is the polyol unsaturation which is below 1 meg/g.

The polyols of (b2) include conditions where the polyol is reacted with a polyisocyanate to form a prepolymer and subsequently polyol is optionally added to such a prepolymer. Thus polyols having functionality greater than what is given based on initiators (2ba)-(2be) can be obtained. For example, a diisocyanate such as 4,4'-diphenylmethane diisocyanate, can be reacted with an excess of initiator to couple it and the initiator-terminated polyisocyanate prepolymer can subsequently be reacted with an alkylene oxide. Thus when A of Formula II is oxygen and s is 3, this gives a polyol with a functionality of 4. When A of Formula II is nitrogen and s is 3, this gives a polyol with a functionality of 10. Higher functional compounds can also be prepared by coupling the initiators by reaction with a diepoxide compound such as ERL 4221 made by Union Carbide Corporation. Use of glycidol gives also polyols with increased functionalities Polyester polyols can be prepared by the reaction of (b2) with a diacid. These can be used in combination with conventional polyester polyols as used today in slabstock or in elastomers, such as shoe soles.

The limitations described with respect to the characteristics of the polyols (b1) and (b2) above are not intended to be restrictive but are merely illustrative of the large number of possible combinations for the polyol or polyols used.

In one embodiment of Formula I, R is methyl. Preferably n in Formula I is an integer of 2 to 12, preferably 2 to 6, and more preferably 2 to 4. In a preferred embodiment, R is methyl and n is an integer of 2 to 4.

Compounds of Formula I can be made by standard procedures known in the art Examples of commercially available compounds of Formula I include N-methyl-1,2-ethanediamine and N-methyl-1,3-propanediamine.

In one embodiment of Formula II, R is methyl. Preferably R' at each occurrence of Formula II is an alkyl group with the same number of carbon atoms. Preferably m is an integer from 2 to 6. Products of formula II are made using standard procedures known in the art or are commercially available. For example, N,N-dimethyl-tris(hydroxymethyl) aminomethane can be made by methylation of tris-amino, or tris(hydroxymethyl)aminomethane; an aminoalcohol commercially available from ANGUS Chemical.

Similarly for compounds of Formula III, R is preferably methyl and R' at each occurrence is an alkyl with the same number of carbon atoms. Representative examples of (b2c) include dimethylaminoethanolamine, hydroxymethyl oxazolidine.

Example compounds of (b2d) are diamino or dihydroxy derivatives of piperazine such as N-bis(2-amino-isobutyl) piperazine. Compounds of (b2d) are commercially available or can be made by standard procedures known in the art.

A representative example of (b2e) and Formula IV is N-methyl-cyclohexylamine.

The weight ratio of (b1) to (b2) will vary depending on the amount of additional catalyst one may desire to add to the reaction mix and to the reaction profile required by the specific application. Generally if a reaction mixture with a base level of catalyst having specified curing time, (b2) is added in an amount so that the curing time is equivalent where the reaction mix contains at least 10 percent by weight less catalyst. Preferably the addition of (b2) is added to give a reaction mixture containing 20 percent less catalyst than the base level. More preferably the addition of (b2) will reduce the amount of catalyst required by 30 percent over the base level. For some applications, the most preferred level of (b2) addition is where the need for a volatile tertiary or reactive amine catalysts or organometallic salt is eliminated.

Combination of two or more autocatalytic polyols of (b2) type can also be used with satisfactory results in a single polyurethane formulation when one wants for instance to adjust blowing and gelling reactions modifying the two polyol structures with different functionalities, equivalent weights, ratio EO/PO etc, and their respective amounts in the formulations.

Acid neutralization of the polyol (b2) can also be Considered when for instance delayed action is required. Acids used can be carboxylic acids such as formic or acetic acids, an amino acid or a non-organic acid such as sulfuric or phosphoric acid.

Polyols pre-reacted with polyisocyanates and polyol (b2) with no free isocyanate functions can also be used in the polyurethane formulation. Isocyanate prepolymers based on polyol (b2) can be prepared with standard equipment, using conventional methods, such a heating the polyol (b2) in a reactor and adding slowly the isocyanate under stirring and then adding eventually a second polyol, or by prereacting a first polyol with a diisocyanate and then adding polyol (b2).

The isocyanates which may be used with the autocatalytic polyols of the present invention include aliphatic, cycloaliphatic, arylaliphatic and aromatic isocyanates. Aromatic isocyanates, especially aromatic polyisocyanates are preferred.

Examples of suitable aromatic isocyanates include the 4,4'-, 2,4' and 2,2'-isomers of diphenylmethane diisocyante (MDI), blends thereof and polymeric and monomeric MDI blends toluene-2,4' and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimentyldiphenyl, 3-methyldiphenylmethane-4,4'-diisocyanate and diphenyletherdiisocyanate and 2,4,6-triisocyanatotoluene and 2,4,4'-triisccyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used. MDI or TDI based prepolymers can also be used, made either with polyol (b1), polyol (b2) or any other polyol as described heretofore. Isocyanate-terminated prepolymers are prepared by reacting an excess of polyisocyanate with polyols, including aminated polyols or imines/enamines thereof, or polyamines.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, saturated analogues of the above mentioned aromatic isocyanates and mixtures thereof.

The preferred polyisocyantes for the production of rigid or semi-rigid foams are polymethylene polyphenylene isocyanates, the 2,2', 2,4' and 4,4' isomers of diphenylmethylene diisocyanate and mixtures thereof. For the production of flexible foams, the preferred polyisocyanates are the toluene-2,4- and 2,6-diisocyanates or MDI or combinations of TDI/MDI or prepolymers made therefrom.

Isocyanate tipped prepolymer based on polyol (b2) can also be used in the polyurethane formulation. It is thought that using such an autocatalytic polyol in a polyol isocyanate reaction mixture will reduce/eliminate the presence of unreacted isocyanate monomers. This is especially of interest with volatile isocyanates such as TDI and/or aliphatic isocyanates in coating and adhesive applications since it improves handling conditions and workers safety.

For rigid foam, the organic polyisocyanates and the isocyanate reactive compounds are reacted in such amounts that the isocyanate index, defined as the number or equivalents of NCO groups divided by the total number of isocyanate reactive hydrogen atom equivalents multiplied by 100, ranges from 80 to less than 500 preferably from 90 to 100 in the case of polyurethane foams, and from 100 to 300 in the case of combination polyurethane-polyisocyanurate foams. For flexible foams, this isocyanate index is generally between 50 and 120 and preferably between 75 and 110.

For elastomers, coating and adhesives the isocyanate index is generally between 80 and 125; preferably between 100 to 110.

For producing a polyurethane-based foam, a blowing agent is generally required. In the production of flexible polyurethane foams, water is preferred as a blowing agent. The amount of water is preferably in the range of from 0.5 to 10 parts by weight, more preferably from 2 to 7 parts by weight based on 100 parts by weight of the polyol. Carboxylic acids or salts are also used as blowing agents and polyols such as (b2) are especially effective for this application.

In the production of rigid polyurethane foams, the blowing agent includes water, and mixtures of water with a hydrocarbon, or a fully or partially halogenated aliphatic hydrocarbon. The amount of water is preferably in the range of from 2 to 15 parts by weight, more preferably from 2 to 10 parts by weight based on 100 parts of the polyol. With excessive amount of water, the curing rate becomes lower, the blowing process range becomes narrower, the foam density becomes lower, or the moldability becomes worse. The amount of hydrocarbon, the hydrochlorofluorocarbon, or the hydrofluorocarbon to be combined with the water is suitably selected depending on the desired density of the foam, and is preferably not more than 40 parts by weight, more preferably not more than 30 parts by weight based on 100 parts by weight of the polyol. When water is present as an additional blowing agent, it is generally present in an amount from 0.5 to 10, preferably from 0.8 to 6 and more preferably from 1 to 4 and most preferably from 1 to 3 parts by total weight of the total polyol composition.

Hydrocarbon blowing agents are volatile $C_1$ to $C_5$ hydrocarbons. The use of hydrocarbons is known in the art as disclosed in EP 421 269 and EP 695 322. Preferred hydrocarbon blowing agents are butane and isomers thereof, pentane and isomers thereof (including cyclopentane), and combinations thereof.

Examples of fluorocarbons include methyl fluoride, perfluoromethane, ethyl fluoride, 1,1-difluoroethane, 1,1,1-trifluoroethane (HFC-143a), 1,1,1,2-tetrafluoroethane (HFC-134a), pentafluorroethane, difluoromethane, perfluoroethane, 2,2-difluoropropane, 1,1,1-trifluoropropane, perfluoropropane, dichloropropane, difluoropropane, perfluorobutane, perfluorocyclobutane.

Partially halogenated chlorocarbons and chlorofluorocarbons for use in this invention include methyl chloride, methylene chloride, ethyl chloride, 1,1,1-trichloroethane, 1,1-dichloro-1-fluoroethane (FCFC-141b), 1-chloro-1,1-difluoroethane (HCFC-142b), 1,1-dichloro-2,2,2-trifluoroethane (HCHC-123) and 1-chloro-1,2,2,2-tetrafluoroethane (HCFC-124).

Fully halogenated chlorofluorocarbons include trichloromonofluoromethane (CFC-11) dichlorodifluoromethane (CFC-12), trichlorotrifluoroethane (CFC-113), 1,1,1trifluoroethane, pentafluoroethane, dichlorotetrafluoroethane (CFC-114), chloroheptafluoropropane, and dichlorohexafluoropropane. The halocarbon blowing agents may be used in conjunction with low-boiling hydrocarbons such as butane, pentane (including the isomers thereof), hexane, or cyclohexane or with water.

Use of carbon dioxide, either as a gas or as a liquid, as auxiliary blowing agent is especially of interest when water is present with the present technology since polyols (b2) are less sensitive to acidity than conventional amines.

In addition to the foregoing critical components, it is often desirable to employ certain other ingredients in preparing polyurethane polymers. Among these additional ingredients are surfactants, preservatives, flame retardants, colorants, antioxidants, reinforcing agents, stabilizers and fillers.

In making polyurethane foam, it is generally preferred to employ an amount of a surfactant to stabilize the foaming reaction mixture until it cures. Such surfactants advantageously comprise a liquid or solid organosilicone surfactant. Other surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of larger, uneven cells. Typically, 0.2 to 3 parts of the surfactant per 100 parts by weight total polyol (b) are sufficient for this purpose.

One or more catalysts for the reaction of the polyol (and water, if present) with the polyisocyanate can be used. Any suitable urethane catalyst may be used, including tertiary amine compounds, amines with isocyanate reactive groups and organometallic compounds. Preferably the reaction is carried out in the absence of an amine or an organometallic catalyst or a reduced amount as described above. Exemplary tertiary amine compounds include triethylenediamine, N-methylmorpholine, N,N-dimethylcyclohexylamine, pentamethyldiethylenetriamine, tetramethylethylenediamine, bis (dimethylaminoethyl)ether, 1-methyl-4-dimethylaminoethyl-piperazine, 3-methoxy-N-dimethylpropylamine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-laurate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. The amount of amine catalysts can vary from 0.02 to 5 percent in the formulation or organometallic catalysts from 0.001 to 1 percent in the formulation can be used.

A crosslinking agent or a chain extender may be added, if necessary. The crosslinking agent or the chain extender includes low-molecular polyhydric alcohols such as ethylene glycol, diethylene glycol, 1,4-butanediol, and glycerin; low-molecular amine polyol such as diethanolamine and triethanolamine; polyamines such as ethylene diamine, xlylenediamine, and methylene-bis(o-chloroaniline). The use of such crosslinking agents or chain extenders is known in the art as disclosed in U.S. Pat. Nos. 4,863,979 and 4,963,399 and EP 549,120.

When preparing rigid foams for use in construction, a flame retardant is generally included as an additive. Any known liquid or solid flame retardant can be used with the autocatalytic polyols of the present invention. Generally such flame retardant agents are halogen-substituted phosphates and inorganic flame proofing agents. Common halogen-substituted phosphates are tricresyl phosphate, tris (1,3-dichloropropyl phosphate, tris(2,3-dibromopropyl) phosphate and tetrakis (2-chloroethyl)ethylene diphosphate. Inorganic flame retardants include red phosphorous, aluminum oxide hydrate, antimony trioxide, ammonium sulfate, expandable graphite, urea or melamine cyanurate or mixtures of at least two flame retardants. In general, when present, flame retardants are added at a level of from 5 to 50 parts by weight, preferable from 5 to 25 parts by weight of the flame retardant per 100 parts per weight of the total polyol present.

The applications for foams produced by the present invention are those known in the industry. For example rigid foams are used in the construction industry and for insulation for appliances and refrigerators. Flexible foams and elastomers find use in applications such as furniture, shoe soles, automobile seats, sun visors, steering wheels, armrests, door panels, noise insulation parts and dashboards.

Processing for producing polyurethane products are well known in the art. In general components of the polyurethane-forming reaction mixture may be mixed together in any convenient manner, for example by using any of the mixing equipment described in the prior art for the purpose such as described in Polyurethane Handbook, by G. Oertel, Hanser publisher.

The polyurethane products are either produced continuously or discontinuously, by injection, pouring, spraying, casting, calendering, etc; these are made under free rise or molded conditions, with or without release agents, in-mold coating, or any inserts or skin put in the mold. In case of flexible foams, those can be mono- or dual-hardness.

For producing rigid foams, the known one-shot prepolymer or semi-prepolymer techniques may be used together with conventional mixing methods including impingement mixing. The rigid foam may also be produced in the form of slabstock, moldings, cavity filling, sprayed foam, frothed foam or laminates with other material such as paper, metal, plastics or wood-board. Flexible foams are either free rise and molded while microcellular elastomers are usually molded.

The following examples are given to illustrate the invention and should not be interpreted as limiting in anyway. Unless stated otherwise, all parts and percentages are given by weight.

A description of the raw materials used in the examples is as follows.

| | |
|---|---|
| DEOA 100 percent | is pure diethanolamine. |
| Tegostab B8715 LF | is a silicon-based surfactant available from Goldschmidt AG. |
| Tegostab B8719 LF | is a silicon-based surfactant available from Goldschmidt AG. |
| Tegostab B4113 | is a silicone-based surfactant available from Goldschmidt AG. |
| Dabco DC 5169 | is a silicone-based surfactant available from Air Products and Chemicals Inc. |
| Dabco 33 LV | is a tertiary amine catalyst available from Air Products and Chemicals Inc. |
| Dabco NE-200 | is a reactive tertiary amine catalyst available from Air Products and Chemicals Inc. |
| Polycat 58 | is a tertiary amine catalyst available from Air Products and Chemicals Inc. |
| Toyocat RX-20 | is a reactive amine catalyst Available from Tosoh Corp. |
| DMAPA | is N,N-dimethyl propylamine. |
| DMEA | is N,N-dimethylethanolamine. |
| VORANOL CP 1421 | is glycerine initiated polyoxypropylene polyoxyethylene polyol having an average hydroxyl number of 32 available from The Dow Chemical Company. |
| VORANOL 9815 | is a glycerol initiated polyoxypropylene polyoxyethylene polyol having an average hydroxyl number of 28 available from The Dow Chemical Company. |
| VORANOL CP 6001 | is a glycerol initiated polyoxypropylene polyoxyethylene polyol having an average hydroxyl number of 28 available from The Dow Chemical Company. |
| SPECFLEX NC 632 | is a 1,700 EW polyoxypropylene polyoxyethylene polol initiated with a blend of glycerol and Sorbitol available from The Dow Chemical Company |
| SPECFLEX NC-700 polyol | is a 40 percent SAN based copolymer with an average hydroxyl number of 20 available from The Dow Chemical Company. |
| SPECFLEX NS 540 | is an MDI-based isocyanate available from The Dow Chemical Company. |
| Specflex NE-150 | is a MDI based isocyanate prepolymer available from The Dow Chemical Company. |
| VORANATE T-80 | is TDI 80/20 available from The Dow Chemical Company. |
| Rubinate 7403 | is an isocyanate available from Huntsman-ICI |
| Polyol A | is a 1,000 equivalent weight propoxylated monol with 15 percent EO capping initiated with DMEA. |
| Polyol B | is a 1,700 EW propoxylated triol with 15 percent EO capping initiated with N,N-dimethyl-Tris-(Hydroxymethyl)-aminomethane. |
| Polyol C | is a 1,000 equivalent weight propoxylated triol initiated with N-methyl-1,3-propanediamine |
| Polyol D | is a 1,000 EW PO monol based on 2-dimethylamino-2-methyl-1 propanol with 15 percent EO capping. |

All foams were made in the laboratory by preblending polyols, surfactants, crosslinkers, catalysts and water, then by adding the isocyanates under stirring at 3,000 RPM for 5 seconds. At the end of mixing the reactants are poured either in a cardboard box or in a plastic cup for free rise foaming, or are poured in a 30×30×10 cm aluminum mold heated at 55° C. which is subsequently closed. The release agent used is Klueber 41-2013 available from Klueber Chemie. With free rise foams main reactivity parameters such as cream time, gel time and full rise time are recorded. In the case of molded parts, curing at a specific demolding times is assessed by manually demolding the part and looking at hand marking defects until the minimum demolding time is reached where there is no surface defects. With both free rise

EXAMPLE 1

Free rise flexible foams were made according to formulation 1A and 1B based on polyols of the invention. For comparison, free rise foams were made according to formulation 1C, using the starter of polyol A as a catalyst at a concentration as present in 100 part by weight of polyol A. This last foam is not part of the invention. All formulations are in parts by weight. The results are shown in the following table.

|  | 1A | 1B | 1C* |
|---|---|---|---|
| Voranol 9815 | 71 | 66 | 76 |
| Specflex NC 700 | 24 | 24 | 24 |
| Polyol A | 5 | 10 | 0 |
| DMEA | 0 | 0 | 0.9 |
| DEOA | 0.5 | 0.5 | 0.5 |
| B-8715 | 0.5 | 0.5 | 0.5 |
| B-8719 | 0.15 | 0.15 | 0.15 |
| Water | 2.5 | 2.5 | 2.5 |
| Rubinate 7403 | 47.7 | 47.7 | 47.7 |
| Cream Time (s) | 23 | 22 | 11 |
| Gel Time (s) | 240 | 165 | 190 |
| Rise Time (s) | 360 | 260 | 295 |
| Free rise density kg/m3 | 58.3 | 51.7 | 47.3 |
| Comment on final foam | Slight odor | slight odor | Unpleasant odor |

*Not an example of the present invention.

These three formulations were then produced at a density of 59 kg/m3 using a mold kept at 55° C. Parts obtained showed good skin aspect. Foam 1C did have a strong, unpleasant amine smell at demold, showing that not all of the DMEA, although containing an OH group, did not fully react during foam rise and subsequent curing. These examples show that polyol A at low concentration in the formulation produce flexible foam without the need for conventional amine catalysts.

EXAMPLE 2

Two free rise and two molded flexible PU foams were made using a high pressure machine with the following formulations 2A and 2B, both based on polyol A:

|  | Formulation 2A | | Formulation 2B | |
|---|---|---|---|---|
| Process | Free rise | Molded | Free rise | Molded |
| VORANOL CP 6001 | 89.4 | 89.4 | 89.4 | 89.4 |
| Polyol A | 10.6 | 10.6 | 10.6 | 10.6 |
| VORANOL CP 1421 | 2.65 | 2.65 | 2.65 | 2.65 |
| Water | 4.6 | 4.6 | 4.6 | 4.6 |
| DEOA 100 percent | 0.35 | 0.35 | 0.35 | 0.35 |
| glycerol | 0.10 | 0.10 | 0.10 | 0.10 |
| DMAPA | 0.20 | 0.20 | 0.20 | 0.20 |
| Polycat 58 | 0.10 | 0.10 | 0.10 | 0.10 |
| Tegostab B4113 | 0.5 | 0.5 | 0.5 | 0.5 |
| Specflex NE-150 | 70.9 | 70.9 | 79.2 | 79.2 |
| Cream time (s) | 10 |  | 9 |  |
| Gel time (s) | 68 |  | 68 |  |
| Rise time (s) | 83 |  | 89 |  |
| Exit time (s) |  | 40 |  | 42 |
| Demold time (min) |  | 3' 30 |  | 3' 30 |
| Density Kg/m3 | 30 | 44.7 | 29 | 45.0 |

These examples confirm that the use of polyol A at low concentration in the formulation produces flexible foam with fast demolding time using only isocyanate reactive catalysts DMPA and Polycat 58, but without the need for strong catalysts such as, Dabco, 33 LV or Niax A-1. Hence foams produced have very low amine emission as demonstrated in example 5.

EXAMPLE 3

A free rise flexible polyurethane foam was made with polyol B using formulation 3 given below, which contains no amine catalyst:

| Process | Formulation 3 Free rise |
|---|---|
| VORANOL 9815 | 10 |
| Specflex NC-700 | 24 |
| VORANOL CP-1421 | 2.0 |
| Polyol B | 66 |
| Water | 2.5 |
| DEOA 100 percent | 0.5 |
| Tegostab B 8719LF | 0.15 |
| Specflex NS-540 | 38.2 |
| VORANATE T-80 | 4.2 |
| Cream time s | 15 |
| Gel time s | 198 |
| Rise time s | 147 |
| Density kg/m3 | 48.9 |

This example shows that polyol B produces good foam without the need to use conventional amine catalysts.

EXAMPLE 4

Three molded foams 4A, 4B and 4C were produced on a high pressure machine using polyol B in the formulation and low levels of amine catalysts reactive with isocyanate. These tests confirm that good foam processing and physical characteristics are obtained.

|  | 4 A | 4 B | 4 C |
|---|---|---|---|
| VORANOL CP 6001 | 61.2 | 61.2 | 61.2 |
| Polyol B | 38.8 | 38.8 | 38.8 |
| VORANOL CP1421 | 1.6 | 1.6 | 1.6 |
| Water | 4.0 | 4.0 | 4.0 |
| DEOA 100 percent | 0.37 | 0.37 | 0.37 |
| Dabco NE-200 | 0.21 | 0.21 | 0.21 |
| Toyocat RX-20 | 0.21 | 0.21 | 0.21 |
| Glycerol | 0.10 | 0.10 | 0.10 |
| Tegostab B413 | 0.53 | 0.53 | 0.53 |
| Specflex NE-150 | 63.3 | 70.4 | 73.8 |
| Exit time (s) | 83 | 68 | 105 |
| Demolding time (min) | 4' 30 | 4' 30 | 4' 30 |
| Molded density | 44.6 | 45.5 | 45.8 |

These examples confirm that polyol B produces fast demolding foam with low level of non-fugitive catalysts. Hence these foams have very low emission as demonstrated in Example 5.

EXAMPLE 5

Accelerated aging tests under heat were carried out in closed containers in the presence of a PVC sheet under the following conditions: a foam sample size 50×50×50 mm (about 6 grams of foam) cut from each of the pads' cores produced with the formulations reported hereafter was placed in the bottom of a one-liter glass jar, then a piece of gray PVC skin reference E6025373AO175A obtained from a Benecke-Kaliko was hung with a Chromium-Nickel alloy based string supported by the rim of the jar which was then sealed. All of the jars were then put in an oven heated at 115° C. for 72 hours (3 days). After cooling the PVC sheet was then measured for color changes using a Minolta Chroma Meter CR 210, which is a compact tri-stimulus color analyzer for measuring reflective colors of surfaces such as cloth or textured surfaces. The higher the reading and calculation of Delta E, the more colored is the sample after aging compared with the control sample of PVC skin which was aged by itself in a jar not containing any foam. The smaller the reading, the closer is the sample to the control PVC. This simple test measures the effect of the amine vapors coming from the foam on PVC dehydrochlorination and hence change in color and texture. For instance foam 5* catalyzed with conventional tertiary amines (Dabco 33 LV at 0.05 PHP; Niax A-1 at 0.05 PHP and Niax A-4 at 1.6 PHP) and which is not part of the invention gives a strong blackening of the PVC skin and high Minolta rating of over 20. The other foams are the ones described in previous examples.

|  | 5* | 2A | 2B | 4A | 4B | 4C |
|---|---|---|---|---|---|---|
| Minolta Rating Delta E | 20.2 | 6.6 | 3.8 | 2.1 | 1.4 | 0.7 |

*Not part of the present invention

These data confirm that these foams based on polyol A and polyol B, object of the invention, have very low emission since the PVC staining values obtained with this accelerated heat aging test are very low.

EXAMPLE 6

Good foam is produced with polyol D using the following formulation containing no other catalyst:

| Specflex NC 632 | 50 |
|---|---|
| Specflex NC 700 | 40 |
| Polyol D | 10 |
| Water | 3.0 |
| DEOA | 1.2 |
| Dabco DC 5169 | 0.60 |
| Voranate T-80 | 37.4 |
| Cream time (s) | 6 |
| Rise time (s) | 50 |

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for the production of a rigid polyurethane foam by reaction of a mixture of (a) at least one organic polyisocyanate with
(b) a polyol composition comprising
(b1) from 0 to 95 percent by weight of a polyol compound having a functionality of 2 to 8 and a hydroxyl number of from 200 to 800 and
(b2) from 5 to 100 percent by weight of at least one polyol compound having a functionality of 1 to 8 and a hydroxyl number of from 20 to 200,
wherein the weight percent is based on the total amount of polyol component (b), and (2) is obtained by alkoxylation of at least one initiator molecule of (b2a) wherein
(b2a) is $$H_2N-(CH_2)_n-N(R)-H \qquad \text{Formula (I)}$$

where n is an integer from 2 to 12, and
R is a $C_1$ to $C_3$ alkyl group;
or (b2) is a hydroxyl-tipped prepolymer obtained from the reaction of an excess of a polyol obtained by alkoxylation of an initiator of (b2a) with a polyisocyanate;
or (b2) is (b2g) a blend selected from polyols obtained by alkoxylation of an initiator of (b2a) or hydroxyl-terminated prepolymers obtained from polyols based on initiators (b2a);
(c) in the presence of a blowing agent; and
(d) optionally additives or auxiliary agents known per so for the production of rigid polyurethane foams,
wherein the amount of polyol (b2) is present in an amount such that the curing time is substantially equivalent to a similar reaction mixture containing a volatile tertiary amine urethane catalyst where the reaction mixture with a polyol of (2) contains at least 10 percent by weight less of such volatile tertiary amine urethane catalyst.

2. The process of claim 1 wherein the initiator for (b2) is represented by Formula I wherein R is methyl.

3. The process of claim 2 wherein n is from 2 to 4.

4. The process of claim 2 wherein the initiator is N-methyl-1,2-ethanediamine or N-methyl-1,3,-propanediamine.

5. The process of claim 1 for making a rigid polyurethane foam wherein the polyol blend of (b1) and (b2) have an average functionality of 3 to 6 and an average hydroxyl number of 200 to 800.

6. The process of claim 5 wherein the mixture contains a blowing agent selected from a hydrocarbon, a hydrochlorofluorocarbon, a hydrofluorocarbon, a hydrochlorocarbon or a mixture thereof.

7. The process of claim 6 wherein the blowing agent further contains 0.5 to 10 parts by weight of water per 100 parts per weight of (b).

8. The process of claim 7 wherein the reaction mixture contains one or more flame retardants.

9. The process of claim 5 wherein the polyisocyanate is polymethylene polyphenylene diisocyanate, or isomers of diphenylmethylene diisocyanate or mixtures thereof.

10. The process of claim 1 wherein the polyisocyanate (a) contains at least one polyisocyanate that is a reaction product of an excess of polyisocyanate with a polyol which contains an initiator of (b2a).

11. The process of claim 1 wherein the polyol (b) contains a polyol-terminated prepolymer obtained by the reaction of an excess of polyol with a polyisocyanate wherein the polyol is a polyol as defined by (b2) or is a mixture of (b2) with another polyol.

12. A rigid polyurethane product produced by the process of claim 5.

13. A prepolymer formed by reaction of an excess of polyisocyanate with a polyol having a functionality of 1–8 and a hydroxyl number of from 20 to 200 obtained by alkoxylation of an initiator of the Formula

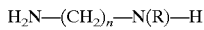   Formula (I)

wherein n is an integer from 2 to 12, and

R is a $C_1$ to $C_3$ alkyl group.

14. A prepolymer formed by the reaction of an excess of a polyol having a functionality of 1 to 8 and a hydroxyl number of from 20 to 200 obtained by alkoxylation of an initiator of the Formula

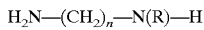   Formula (I)

wherein n is an integer from 2 to 12, and

R is a $C_1$ to $C_3$ alkyl group, with a polyisocyanate.

15. The process of claim 1 wherein polyol (b2) further contains at least one polyol having a functionality of 1 to 8 and a hydroxyl number of from 20 to 200 obtained by alkoxylation of at least on initiator molecule of (b2b), (b2c), (b2f) or (b2e) wherein (b2b) a compound which contains a dialkylylamino group pendant to a polyhydroxy or polyamino molecule of Formula II

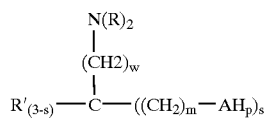   (Formula II)

where R' at each occurrence is independently a $C_1$ to $C_3$ alkyl group and R is a $C_1$ to $C_3$ alkyl group;

s is an integer from 1 to 3;

m is an integer from 1 to 12;

A is nitrogen or oxygen; and p is 2 when A is nitrogen and is 1 when A is oxygen;

w is 0, 1 or 2;

(b2c) is a dimethylamino group pendant to a monohydroxy or monamino structure of Formula III

   (Formula III)

where $R^2$ is $NR'_2$ or a 5 substituted, 1-aza-3,7-dioxabicyclo [3.3.0] octane;

R, R', A, and p, are as previously defined;

y is 0 or 1; and x is 0, 1 or 2;

(b2e) is a compound of Formula IV

   (Formula IV)

with $R^3$ a $C_5$ to $C_6$ cycloalkyl group and R is as previously defined (b2f) is a compound of formula V

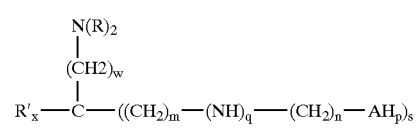   (Formula V)

where R, R', m, n, A, p and w are as previously defined;

x is 0, 1 or 2;

s is and integer from 1 to 3;

and q is an integer from 0 to 12.

16. A process for the production of a flexible polyurethane foam by reaction of a mixture of (a) at least one organic polyisocyanate with (b) a polyol composition comprising (b1) from 0 to 95 percent by weight of a polyol compound having a functionally of 2 to 8 and a hydroxyl number of from 20 to 100 and (b2) from 5 to 100 percent by weight of at least one polyol compound having a functionality of 1 to 8 and a hydroxyl number of from 20 to 200, wherein tile weight percent is based on the total amount of polyol component (b), and (b2) is obtained by alkoxylation of at least one initiator molecule of (b2a) wherein (b2a) is

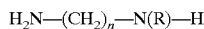   Formula (I)

where n is an integer from 2to 12, and

R is a $C_1$ to $C_3$ alkyl group;

or (2) is a hydroxyl-tipped prepolymer obtained from the reaction of an excess of a polyol obtained by alkoxylation of an imitator of (b2a) with a polyisocyanate;

or (2) is (b2g) a blend selected from polyols obtained by alkoxylation of an initiator of (b2a) or hydroxyl-terminated prepolymers obtained from polyols based on initiators (b2a)

(c) optionally in the presence of a blowing agent; and (d) optionally additives or auxiliary agents known per se for the production of flexible polyurethane foams wherein the amount of polyol (b2) is present in an amount such that the curing time is substantially equivalent to a similar reaction mixture containing a volatile tertiary amino urethane catalyst where the reaction mixture with a polyol of (b2) contains at least 10 percent by weight less of such volatile tertiary amine urethane catalyst and an acid is used in the mixture to act either as a delayed action additive or as a blowing agent in the case of a carboxylic acid.

17. The process of claim 16 wherein the initiator for (b2) is represented by Formula I wherein R is methyl.

18. The process of claim 17 wherein from 2 to 4.

19. The process of claim 18 wherein the initiator is N-methyl-1,2-ethanediamine or N-methyl-1,3,-propanediamine.

20. The process of claim 16 wherein polyol (b2) further contains at least one polyol having a functionality of 1 to 8 and a hydroxyl number of from 20 to 200 obtained by alkoxylation of at least one initiator molecule of (b2b), (b2c), (b2f) or (b2e) wherein (b2b) is a compound which contains a dialkylylamino group pendant to a polyhydroxy or polyamino molecule of Formula II

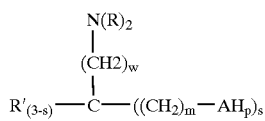 (Formula II)

where R' at each occurrence is independently a $C_1$ to $C_3$ alkyl group and R is a $C_1$ to $C_3$ alkyl group;

s is an integer from 1 to 3;

m is an integer from 1 to 12;

A is nitrogen or oxygen; and p is 2 when A is nitrogen and is 1 when A is oxygen;

w is 0, 1 or 2;

(b2c) is a dimethylamino group pendant to a monohydroxy or monamino structure of Formula III

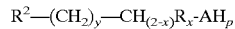 (Formula III)

where $R^2$ is $NR'_2$ a or a 5 substituted, 1-aza-3,7-dioxabicyclo [3.3.0] octane;

R, R', A, and p, are as previously defined;

y is 0 or 1; and x is 0,1 or 2;

(b2e) is a compound of Formula IV

 (Formula IV)

with $R^3$ a $C_5$ to $C_6$ cycloalkyl group and R is as previously defined (b2f) is a compound of formula V

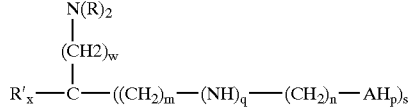 (Formula V)

where R, R', m, n, A, p and w are as previously defined;

x is 0, 1 or 2;

s is and integer from 1 to 3;

and q is an integer from 0 to 12.

\* \* \* \* \*